Feb. 28, 1961 C. TIFFANY 2,972,892
STABLE ELEMENT
Filed July 15, 1958 3 Sheets-Sheet 3
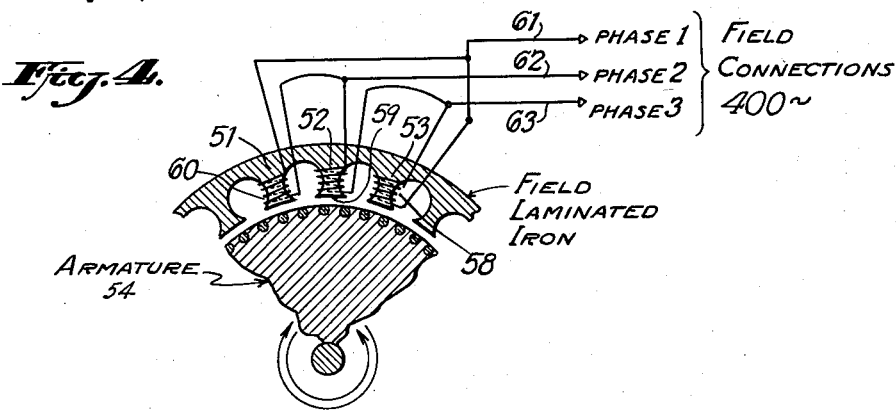
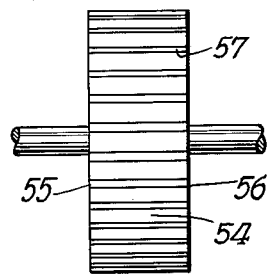
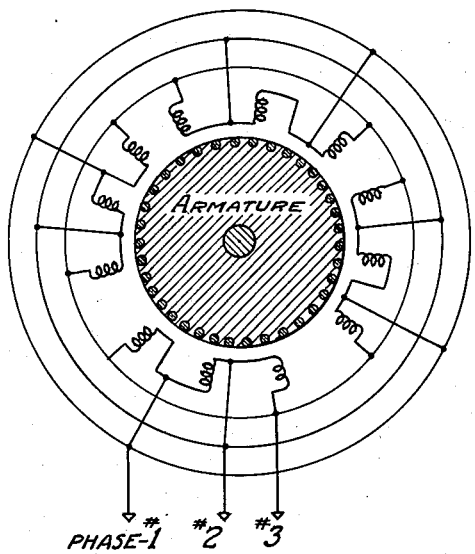
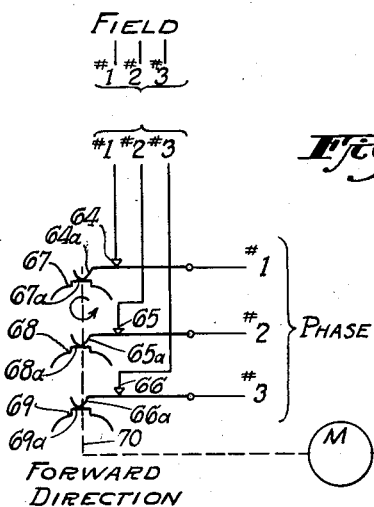
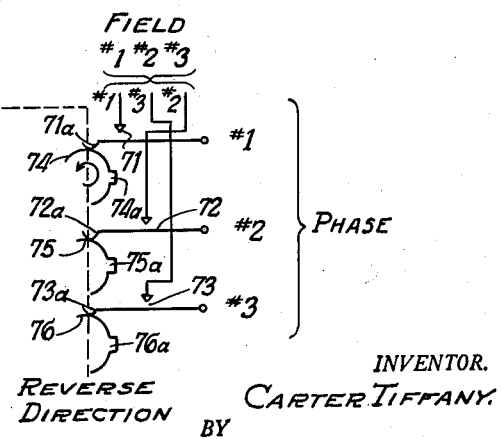
INVENTOR.
CARTER TIFFANY.
BY
ATTORNEYS.

Feb. 28, 1961 C. TIFFANY 2,972,892
STABLE ELEMENT
Filed July 15, 1958 3 Sheets-Sheet 2
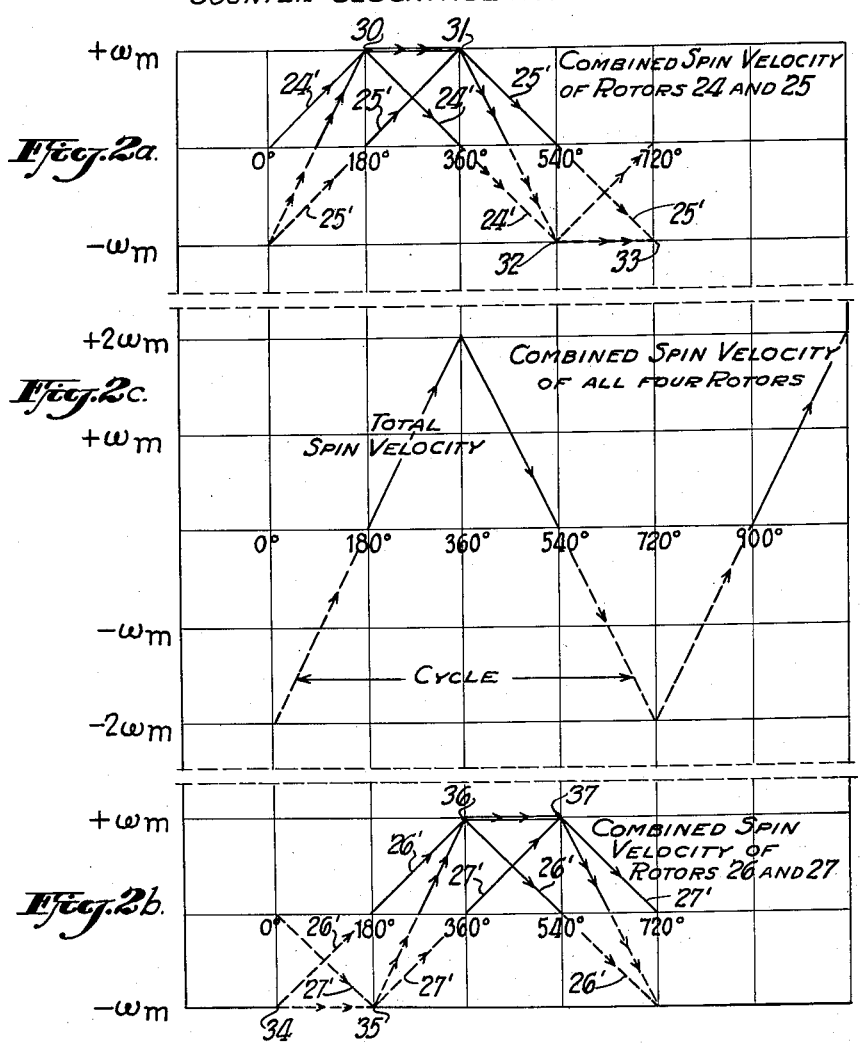
INVENTOR.
CARTER TIFFANY Feb. 28, 1961 C. TIFFANY 2,972,892
STABLE ELEMENT
Filed July 15, 1958 3 Sheets-Sheet 1

INVENTOR.
CARTER TIFFANY
BY
Ward, Neal, Haselton, Orme & McChannon
ATTORNEYS.

United States Patent Office 2,972,892
Patented Feb. 28, 1961

2,972,892
STABLE ELEMENT

Carter Tiffany, Annapolis, Md., assignor to Tiffany Associates, Annapolis, Md., a partnership Filed July 15, 1958, Ser. No. 748,707

10 Claims. (Cl. 74—5.37)

This invention relates to a device stabilized in space by means employing gyroscopic phenomena and which device may be used inter alia as a stable element for a navigational system. More particularly the invention relates to such a device, the orientation of which is stable in an inertial coordinate system, that is, a system in which the stars have fixed directions.

Apparatus of this character have been suggested in the past, all of which employ a continuously spinning gyroscope or a system of such gyroscopes. However, such prior apparatus have been subject to the usual inherent fault of such gyroscopes, namely, friction which produces drift error due to precession, which error can accumulate to a substantial degree unless corrected as by comparison with celestial observations. In gyroscopic navigational systems, for example, of submarines such error due to friction has now been reduced to such small proportions by refinements embodied in the present state of the art that it is of negligible proportions over a period of a few hours. However, if the submarines are submerged for many days such error can accumulate to serious proportions and can constitute a substantial hazard to the safety of the vessel.

One of the objects of the present invention is to provide a stable element which relies upon gyroscopic phenomena for its stability, and which is so constructed and arranged that such drift errors due to friction are fully neutralized.

Another object is to provide a space reference framework device which is fully stabilized in space with respect to the aforementioned inertial coordinate system.

The invention, in one aspect thereof, is constituted by a plurality of gyroscope-like rotors or angularly shiftable masses which are dynamically and statically balanced and which are mounted on suitable mounting means having three orthogonal axes which intersect at a common point, there being two pairs of such oscillatable rotors coaxially mounted on each such axis, such common point of intersection being situated between the two pairs, the total number of pairs of rotors thus being six. Power means are provided for oscillating the rotors on each axis in preselected phase relationship at a common frequency. Each cycle of oscillation comprises angular motion from a position at rest through a selected angular increment to another position at rest and back in the opposite direction to the first position at rest whereby each gyroscope-like rotor reaches its maximum gyroscopic stability at the quarter cycle and three quarter cycle point of its cycle. The two rotors of each such pair are oscillated out of phase with one another to the extent of one quarter cycle by suitable phase control means, the two rotors of each pair thus coacting whereby the gyroscopic stability of one is at a maximum when that of the other is at a minimum. By virtue of the quarter cycle phase difference of the two rotors, maximum gyroscopic stability is achieved during two quarter cycles thereof, for example, the second and fourth quarter cycles. The other pair of rotors coaxially mounted with the pair just mentioned is caused to oscillate by suitable power means and in an analogous manner out of phase with one another to the extent of one quarter cycle, and preferably such second pair of rotors is caused to oscillate in a selected phase relation with the first pair whereby maximum gyroscopic stability of the second pair is achieved during two quarter cycles thereof, preferably during the first and third quarter cycles of the first pair whereby the effective gyroscopic stability of the four rotors is periodic with such full cycle. Such power means for oscillating such rotors can comprise suitable electrical motor winding means wherein the rotor comprises an angularly shiftable armature under the influence of stator field windings. The rotor oscillations are produced by reversing the flow of electrical energy in the field windings. Also, suitable coil means are connected to each rotor in the manner of the balance spring of a watch thereby alternately to absorb the release of a watch thereby alternately to absorb the release of energy in response to such rotor oscillations and to aid in controlling the frequency of rotor reversal.

The invention in a further aspect thereof is constituted by a single rotor or mass mounted for angular motion about a selected axis and which rotor is under the influence of power means for causing same to shift angularly at high frequency in one direction from one position at rest about such axis through a selected increment, such as 360°, to a second position at rest and back again in the opposite direction to or near such first rest position. Also, a spring, such as a spiral spring, is connected to the rotor at one end thereof, the other end of the spring being axially mounted whereby the spring alternately absorbs and releases energy in response to such angular oscillation of the rotor. Such power means is preferably electrical and is constructed and arranged for producing such oscillations at a constant high frequency.

The above and further objects and novel features will more fully appear from the detailed description when same is read in connection with the accompanying drawings. It is to be expressly understood, however, that the drawings are for purposes of illustration only and are not included as a definition of the limits of the invention, reference for this latter purpose being had to the appended claims.

In the drawings, wherein like reference characters refer to like parts throughout the several views, Fig. 1 is a schematic perspective view of one form of the invention;

Fig. 2 is a side elevation of a group of coaxial rotors comprising a portion of the apparatus shown in Fig. 1;

Fig. 2a is a graphical representation of gyroscopic stability or resistance of one pair of rotors of Fig. 2 during a single cycle of operation thereof;

Fig. 2b is a graphical representation of gyroscopic resistance of the other pair of rotors of Fig. 2 also during a single cycle of operation;

Fig. 2c is a graphical representation of the combined spin velocity of all four of the rotors of Fig. 2;

Fig. 4 is a fragmentary view, partly in section and with parts broken away, of field poles and armature coils comprising means for inducing angular oscillations in the rotors of the present apparatus, such rotors being armatures;

Fig. 5 is a side view of an armature device which may be employed in one form of the present invention;

Fig. 6 is a schematic representation of an armature comprising a rotor and the electrical field winding means for causing same to oscillate;

Fig. 7 is a schematic representation of cam and switching means which can be employed in one form of the present invention for controlling the direction of current in the windings shown in Figs. 4 and 6.

Figure 1:
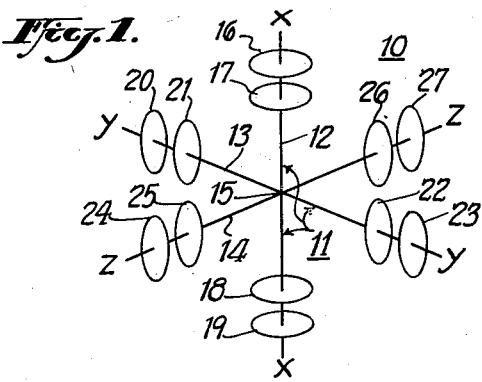
Fig. 1a is a front elevation of a single rotor shown in Fig. 1.

Referring to the drawings in greater detail, the basic element of the apparatus comprising the present invention is an element 10 stabilized in space (Fig. 1) which in the form shown comprises a device employing twelve angularly shiftable elements or rotors, that is, six pairs of such rotors, there being two pairs mounted for oscillation upon each of three orthogonal axes, such axes intersecting at a common point.

Thus there are provided suitable mounting means 11 for such plurality of rotors. It is understood that the term "rotor" as herein employed also refers to a gyroscope-like element which is merely angularly shiftable about an axis. It is not necessary for such an element, as the term is used herein, continuously to rotate in order for it to achieve the status of a rotor, it being adequate if such element angularly shifts through a selected angle which may be greater or less than 360°.

The mounting means 11 include means 12, 13 and 14 embodying three mutually perpendicular axes, namely, x—x, y—y and z—z, any one of which is perpendicular to the other two. Such axes intersect at a common point of intersection 15.

Mounted on opposite sides of the intersection 15 with respect to the axis x—x are the two pairs of coaxial rotors 16, 17 and 18, 19. Such rotors, in the form shown, are symmetrically disposed with respect to the intersection point 15 and are symmetrical in form and shape.

The two pairs of rotors mounted with respect to the axis y—y are 20, 21 and 22, 23, such two pairs being mounted respectively on opposite sides of such point of intersection 15.

Analogously rotor pairs 24, 25 and 26, 27 are coaxially mounted with respect to the axis z—z.

In conventional gyroscopic devices heretofore suggested, errors of drift are caused by spin bearing friction, wind resistance, gimbal bearing friction and changes in the center of gravity due to acceleration. Such causes of error in the past have been considered inherent in such structures. However, the effects thereof can be neutralized or counterbalanced and by means of the construction embodying the present invention such errors are overcome by counteracting moments.

Thus in order to overcome drift produced by the aforementioned spin bearing friction, air resistance, gimbal bearing friction and changes due to the center of gravity of the structure caused by acceleration, it is desirable to construct and arrange a device which will set up equal and opposite or neutralizing forces attributable to gyroscopic phenomena.

For example, it has been suggested in the past, in order to overcome such drift-producing factors, to spin a gyro rotor for a selected period, such as five minutes, in one direction and thereafter reverse the direction of spin for another selected period. Although such expedient may be theoretically correct, it is exceedingly difficult to carry out as a practical matter because if time is the controlling factor the number of revolutions will in fact vary in each direction and if the number of revolutions is the controlling factor, then time will in fact vary. That is, it is exceedingly difficult to select a period for a spin in one direction and have a common number of revolutions in such direction as compared to the number of revolutions for spin in the opposite direction. The result is a slow drift.

In order to overcome such difficulties, the structure described in connection with Fig. 1 is employed having the mounting means (12, 13 and 14) for the plurality of rotors, such mounting means having the three orthogonal axes (x—x, y—y and z—z) any one of which is perpendicular to the other two and all three of which intersect at the common point 15. Each of such rotor mounting means, as aforementioned, carries two oscillating rotors, namely, the aforementioned two pairs for each axes, such as pair 16, 17 and 18, 19 for the axis x—x.

In order to accomplish the aforementioned neutralizing of the drift-producing factors, the rotors mounted coaxially on each such axes operate as follows: for example, consider the rotors 24, 25 and 26, 27 on axis z—z. Rotor 24 is acted upon by suitable power means causing same to start angular motion in one direction and to reach a maximum velocity at 180°. Such angular motion commences from rest and following its reaching such maximum velocity at 180° the rotor is caused to decelerate to zero velocity in the next 180° whereupon the direction of angular motion thereof is reversed and the rotor again is shifted through 360° to its original point of rest, it reaching a maximum velocity again at the 540° point. Thus the total cycle of operation of the rotor 24 in this particular instance is 720°.

The rotor 25 is provided with similar means for effecting such angular motion and moves through a similar cycle but it is 180° out of phase with the rotor 24, namely, a quarter cycle. For example, at the outset of the operation of the apparatus the rotor 24 starts from rest, reaches its maximum angular velocity at the quarter cycle or 180° point whereupon there is immediately initiated the angular motion of the rotor 25.

Figure 1A:
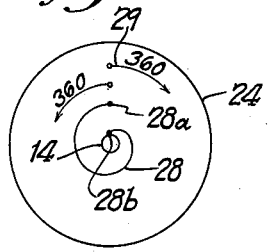

Each of the rotors 16–27, inclusive, is provided with a coil spring somewhat in the nature of the coil spring employed on the flywheel of a conventional watch. Such coil spring is typified by the spring 28 (Fig. 1a) for the rotor 24 which coil at one extremity, namely, 28a, is secured to the rotor 24 and at the opposite extremity 28b to the shaft 14 of the mounting means for the rotor. Obviously as the rotor shifts first in a clockwise direction, namely, in the direction of the arrow 29, the coil spring 28 will be wound up and the reverse will be true when the rotor shifts in the opposite direction to its original position of rest.

The angular oscillations, first in one direction and then in the other, of each of the rotors aforementioned are produced, for example, by a suitable squirrel cage electrical field to appear more fully hereinafter. An A.C. current of 400 c.p.s. can be employed. Such oscillations are induced not only by such current but by the action of the spiral or coil spring 28 aforementioned. The latter alternately absorbs and releases the energy of the motion of the rotor.

The period of oscillation of each rotor is controlled by two factors, namely, the starting and reversal of each cycle and the harmonic charcteristics of its spring, such as 28. The spiral spring, e.g. 28, and the mass of each rotor determine resonance of the oscillation, and the time the power is applied synchronizes the starting and stopping time of each rotor. The 400 cycle power supplies the force to keep the rotors oscillating.

The frequency of oscillation of each rotor remains constant although the degree of angular shift may vary.

By virtue of the fact that the degree of angular shift of each rotor is equal and opposite, the aforementioned errors due to drift are neutralized.

It should be noted that the point of intersection 15 comprises the center of gravity of the structure.

Also, the rotors 16–27, in the form shown, are of common size and symmetrical conformation and arranged symmetrically with respect to the point of intersection 15. Although the invention is not limited to all of the rotors being of a common size, they must be so constructed and arranged that, by virtue of the aforementioned angular oscillations thereof, the drift errors must be neutralized.

Referring now to the operation of the other pair of rotors 26, 27 upon the axis z—z, such rotors operate analogously to the pair 24, 25, that is, in the form shown rotor 26 is angularly oscillated through 720°, namely, 360° in each direction, reaching its maximum velocity at the quarter phase points, namely, 180° and 540°. The rotor 27 is similarly angularly shifted 180° out of phase with the rotor 26.

Referring now to Figs. 2, 2a, 2b and 2c, there will now be described the gyroscopic stability of the apparatus, particular reference being had to the rotors coaxially mounted upon the shaft means having the axis z—z, this this set of rotors being typical of the other sets mounted upon the other two axes.

Gyroscopic stability is a function of the moment of inertia of the rotor about its axis of spin and also of the angular velocity of such rotor. Such stability is independent of spin direction. Furthermore, in an oscillating mass the moment of inertia is a constant but the angular velocity need not be a constant. In the present invention the angular velocity of each of the rotors changes in magnitude and direction as above described and as will be further described herebelow. Consequently the gyroscopic stability of a given single rotor is zero at the start of its angular motion, reaches a maximum value at the time of its greatest angular velocity, decreases again to zero when it comes to rest, and when the rotor reverses such cycle of operation by reversing its direction, equal and opposite forces are produced while it returns to its original position at rest. Thus at the beginning of each half cycle of such a single rotor there is zero gyroscopic stability. I have found it advantageous for the complete cycle of operation of each rotor to be controlled by harmonics and not by degrees of rotation. When the frequency of such an oscillating rotor is constant, the degree of angular shift or the degree of rotation may vary as a result of atmospheric pressure, temperature and other factors. However, all of the rotors in a given structure of this type are affected equally and at the same time and consequently no error occurs which is attributable to such last-mentioned factors. I have found that if the degree of angular shift of each rotor is held constant, the frequency will vary and with probable frequency variation between the rotors ad nconsequent erorrs. As a result the frequency of oscillation of the rotors in the present construction is maintained constant and no attempt is made to insure that each rotor shifts angularly through exactly the same number of degrees.

Furthermore, in the present construction as shown in the drawings, a multiplicity of rotors preferably is employed which are oscillated in a preselected phase relationship in such a manner that only one rotor at a time will be in zero gyroscopic stability.

Gyroscopic stability can be represented by gyroscopic reaction moment (gyroscopic resistance) which is illustrated in the following formula:

$$K = CW\Omega$$

this formula being true when the axis of spin is at right angles to the precession axis and wherein the following are the values:

$K$ = gyroscopic reaction moment induced by a forced precession;
$C$ = moment of inertia of the gyro or rotor about its axis of spin;
$W$ = the angular velocity of the rotor; and
$\Omega$ = the angular velocity of the forced precession.

So long as a rotor is angularly shifting, it is able to offer some gyroscopic resistance to a forced precession regardless of the direction of the spin.

The gyroscopic reaction moment, as aforementioned, provides a representation of gyroscopic stability and the changes in such moment for the rotors 24 and 25 are graphically represented in Fig. 2a by the lines 24' and 25', it being understood that the ordinate of such graphs represents angular velocity of each rotor as indicated by $W_m$.

It will be noted that the two rotors 24 and 25, operating 180° out of phase, achieve the advantage of superimposing the gyroscopic stability of the rotor 25 at its maximum degree upon the gyroscopic stability of the rotor 24 when it is at its minimum degree. That is, when the gyroscopic stability of rotor 24 is zero at the 360° mark on Fig. 2a, the gyroscopic stability of the rotor 25 is at its maximum point.

Referring again to Fig. 2a, it will be observed that the net gyroscopic reaction moment between 0° and 180° is zero by virtue of the counteraction of the effects of the two rotors 24 and 25 operating in opposite directions. However, the net gyroscopic reaction moment between 180° and 360° is represented by the line between points 30 and 31, this comprising a summation of the reaction moments of the two rotors 24 and 25 represented by the quarter phase line of the rotors 24 and 25 between the points 180° and 360°. Analogously between the points 360° and 540° of Fig. 2a the net gyroscopic reaction moment is zero by virtue of the summation of such moments analogous to that existing between the points 0° and 180°, and further the net gyroscopic reaction moment between the points 540° and 720° is represented by the line between the points 32 and 33. It is understood, of course, that the net gyroscopic reaction moment 30, 31 is at an ordinate of $+W_m$ and the net gyroscopic reaction moment 32, 33 is at $-W_m$.

It will be noted that in the graphical representation of Fig. 2a there is an hiatus with respect to gyroscopic reaction moments between the points 0° and 180° and 360° and 540°. In order to remedy this the rotors 26 and 27 are operated in the phase relation represented by Fig. 2b in such a manner that a net gyroscopic reaction moment occurs between points 34 and 35 which exists between 0° and 180° and also a further net gyroscopic reaction moment exists between the points 36 and 37 which will occupy the quarter phase between 360° and 540°. As a result of the superimposition of the gyroscopic reaction moments of all four rotors 24–28, inclusive, and as represented in Figs. 2a and 2b, it will be seen that there will be no hiati in the existence at any time of a gyroscopic reaction moment, there being such reaction moment 34, 35 at the ordinate $-W_m$ between 0° and 180° by virtue of the angular motion of the rotors 26 and 27, the reaction moment 30, 31 by virtue of the rotors 24 and 25 between 180° and 360°, the reaction moment 36, 37 between 360° and 540° and finally the reaction moment 32, 33 between 540° and 720°.

Although the invention in one form thereof embodies the phase relationships which have been graphically represented in Figs. 2a and 2b, the invention is not limited to this particular phase relation, it being understood that other forms of the invention may employ other phase relations.

For example, it may be possible to initiate the operation of the rotor 26 at, for example, 90° phase difference with respect to the rotor 24 instead of contemporaneous therewith as shown in Figs. 2a and 2b.

It is understood, of course, that in Fig. 2b there is represented the gyroscopic reaction moments 26' and 27' attributable respectively to the rotors 26 and 27 while they are angularly shifted as represented in Fig. 2b. The angular velocity of the rotor 26 is at a maximum at 0° as compared to the angular velocity of the rotor 24 which is zero at 0°. Thus the angular velocity of the rotor 26 decreases to zero at the quarter phase point and again increases to a maximum at 360°.

The angular velocity of the rotor 27, on the other hand, is at zero at 0° and hence contemporaneous with the starting of the angular motion of the rotor 24 in a clockwise direction the angular motion of the rotor 27 is started in a counterclockwise direction and thus in an opposite direction thereby to produce the net gyroscopic reaction moments aforementioned, namely, 34, 35—30, 31—36, 37— and 32, 33.

It will be observed that such gyroscopic reaction moments are continuous in point of view of time, there being no hiatus from a time viewpoint as to the existence of some gyroscopic reaction moment.

Furthermore, it should be noted that each rotor, by virtue of its angular motion between 0° and 360° in one half cycle in one direction and its angular motion between 360° and 720° in the opposite direction, creates equal and opposite precession moments. That is, a force acting upon one of the rotors will produce a precession moment in one direction by virtue of a counter-clockwise rotation and conversely will produce a precession moment in the opposite direction by virtue of its angular shifting in the opposite direction.

It will be observed that the gyroscopic reaction moment which can be exerted with respect to each axis under forced precession will be periodic with the period of 720° which is exactly analogous to an alternating electric current in voltage (Fig. 2c).

Regarding the time factor, namely, the frequency of reversal of the rotors or angularly shiftable masses, such frequency of reversal can vary between, for example, one second up to fifty or sixty times per second.

Referring to Fig. 2c which comprises a graph of the combined motion of the four rotors upon a given axis, the maximum rotational speed or maximum angular velocity therein shown is twice the maximum angular velocity of any single rotor. Consequently by analogy with the effectiveness of alternating currents in an electric circuit, the effective spin velocity of the four rotors, and therefore the effective gyroscopic resistance (gyroscopic reaction moment) of the four rotors combined is:

$$2W_m/\sqrt{2} \text{ or } 1.41W_m$$

Thus four rotors angularly shifting as X r.p.m. would offer the same gyroscopic resistance as a single rotor angularly shifting at X×1.41 r.p.m.

The spin velocity of the apparatus embodying the graphical representations of Figs. 2a, 2b and 2c and therefore the gyroscopic resistance thereof which is proportional to such spin velocity, corresponds to the current or voltage in an alternating electric current circuit and such gyroscopic resistance therefore has an effective value similar to that of such alternating current.

Figure 3:
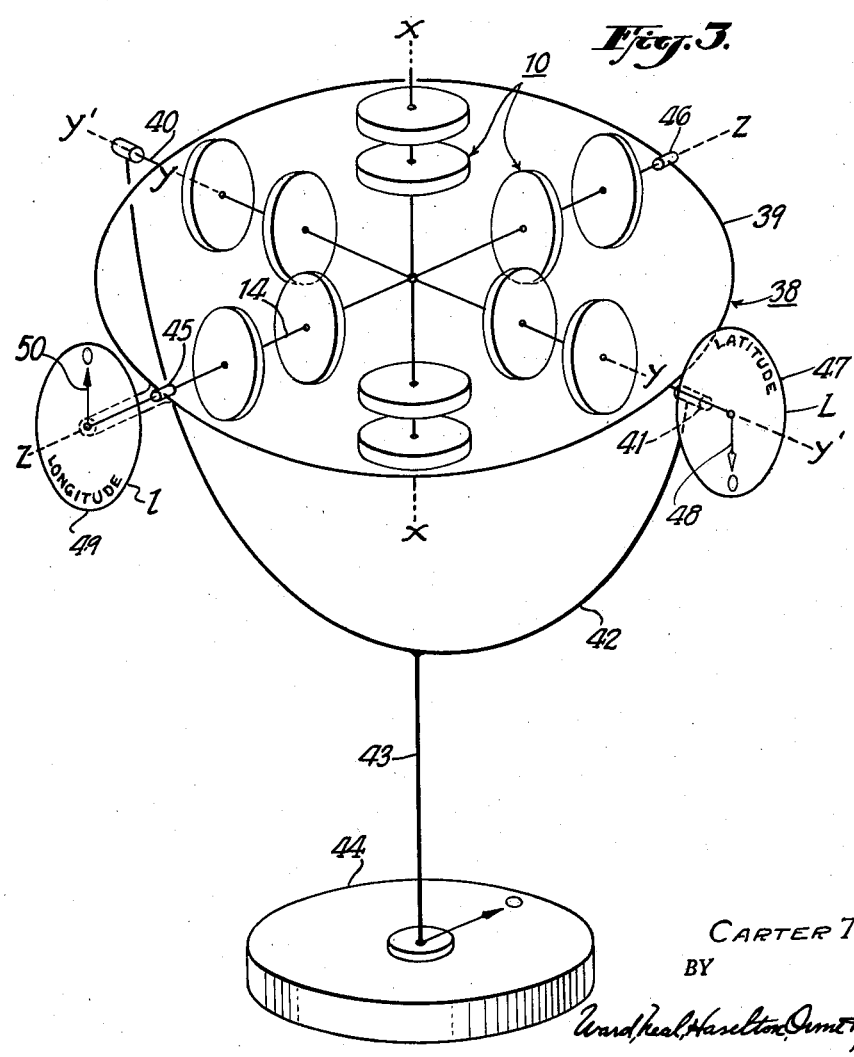
Fig. 3 is a perspective view of the device shown in Fig. 1 but mounted in gimbal ring mountings for three degrees of angular freedom.

Referring now to Fig. 3, there is shown the stable element 10 of Fig. 1 mounted in suitable gimbal rings thereby to provide same with three degrees of freedom. The gimbal ring assembly of Fig. 3 is broadly designated at 38 and includes a first gimbal ring 39 having trunnions 40 and 41 which are supported upon a second gimbal ring 42. The latter, in the form shown, in turn is secured to a vertical post 43 mounted upon a pedestal 44. The vertical post 43 preferably is connected to the pedestal 44 to permit angular movement of the gimbal ring 42 about the axis of the post 43.

The stable element 10 is associated with the gimbal ring 39 in the manner shown wherein the mounting means or shaft means 14 is supported by such ring in bearings 45 and 46 thereby adapting the shaft means 14 for angular movement about the axis z—z which is perpendicular to the y'—y', namely, the axis of the trunnions 40 and 41.

For purposes of indication of changes in latitude and also changes in longitude, the following may be employed: For indicating change in latitude, a dial 47 calibrated to latitude may be secured to the gimbal ring 42. A pointer or indicator 48, which is secured to and angularly shiftable with the trunnion 41, is employed with the dial 47 for latitude indications and when the apparatus is set in motion and set to latitude, changes in such latitude will be reflected by relative movement of the pointer 48 and the calibrated dial 47.

Analogously, for indications of change in longitude, a calibrated dial 49 is secured to the gimbal ring 39, such dial being calibrated to longitude and coacting with a pointer or indicator 50 which is secured to the shaft means 14.

Changes in longitude thus will be indicated, once the apparatus is set in motion, by relative movement of the pointer 50 and the dial 49 and by combining such change with Greenwich sidereal time the actual longitude can be obtained.

Reverting to the dial 47 and the pointer 48, it is understood, of course, that not only can changes in latitude be indicated thereby but also geocentric right ascension. Such geocentric right ascension refers to that of the local meridian of the apparatus.

Thus it is seen that a frame carrying the rotors on the three axes, x—x, y—y and z—z comprising the stable element 10, and when mounted in suitable gimbal rings, is invariant or rigid in space and can comprise a clock revolving once in twenty-four hours and, as aforementioned, can comprise a compass since it can revolve about an axis parallel to the axis of the earth's rotation. Since rays of light from the star Polaris reach the earth in parallel lines, the latter are also parallel to the earth's polar axis. Thus when the present apparatus is oriented with its principal axis parallel to the earth's polar axis, it will point continuously to Polaris. Furthermore, no settling time is required for this stable element as compared to a conventional gyroscopic compass.

One or more apparatus, such as shown in Fig. 3, can be employed for monitoring another gyroscopic device.

Referring now to Figs. 4-7, there will be described examples of means for oscillating the rotors of the present invention.

Shown in Fig. 4 is a schematic view of a plurality of field poles of the field winding of an electric motor of which the armature comprises one of the rotors of the present invention. Three of such field poles, 51, 52 and 53, are illustrated, by way of example, in the fragmentary showing of Fig. 4. There may be a total of twelve of such field poles connected in four groups of three in the manner shown in Fig. 6. Electrical power can be applied to the field coils, for example, external three-phase 400 cycle power creating a rotating magnetic field.

Preferably the armatures, such as armature 54 (Fig. 4), is of laminated iron discs which preferably are slotted as shown in Fig. 5. On the two opposite faces of the armature 54 are two plates 55 and 56, insulated electrically from the iron discs, which may be either of copper or of silver.

Copper or silver bars 57 may be secured in the slots as shown, insulated from the iron discs and soldered to such face plates 55 and 56 making the electrical circuit of each one through a bar and through one plate, through the armature shaft or collar or other suitable connection, and thence through the second face plate and back to the bar. The resistance of such bars and plates must be low to carry the high currents involved.

Referring again to Fig. 4, it will be seen that phases one, two and three are connected to the field windings 58, 59 and 60, via the leads 61, 62 and 63 in the manner shown.

Such phases one, two and three are under the influence of contact or switching means shown in Fig. 7 including switches 64, 65 and 66, respectively, for phases one, two and three. These switches comprise contacts which can be opened and closed under the influence respectively of cam devices 67, 68 and 69, such cam devices including cams 67a, 68a and 69a which respectively coact with switch fingers 64a, 65a and 66a to control said respective switches 64, 65 and 66. The cams 67a, 68a and 69a rotate on a common shaft schematically indicated at 70 driven by a constant speed motor M and, of course, the speed of rotation of such shaft determines the frequency of reversal of direction of the armature. When the cams are in the position shown in Fig. 7 (forward direction), the armature goes in one direction; phases one, two and three of the power line are connected to the windings one, two and three of the field. A second set of switches or contacts 71, 72 and 73 are under the influence of cam devices 74, 75 and 76 embracing cams 74a, 75a and 76a which are also mounted for rotation upon the shaft 70 and respectively coact with switch fingers 71a, 72a and 73a for the purpose of controlling said switches 71, 72 and 73. The switches 71, 72 and 73 are adjusted to close just after the first three mentioned switches open and such switches 71, 72 and 73 reverse the electrical connections to phases two and three thereby stopping the armature and reversing its direction. It is, of course, possible to employ as many sets of cams and switches for as many different armatures as required and the adjustment of such cams as to their phase relation will determine when each of the armatures starts, stops and reverses. Thus, the forward and reverse cams for a particular rotor or pair of rotors are arranged on the shaft 70 so that the switches controlled by those cams operate in the desired relationship. The phase relationship of two rotors constituting a single pair is readily established simply by the respective positions of their switch actuating cams on the shaft 70. The phase relationship of the rotors on the opposite side of the axis is similarly established, as is the relationship of one pair to the other. For example, accepting the optimum number of rotors on a given axis $z$—$z$ as four, 24, 25, 26 and 27, two at each end, and the oscillation of each as an arc of approximately 360°, and then reversing, the natural phase relation will be: rotor 24 starts and, after 90° rotor 25 starts in the same direction, at 180° of rotation of rotor 24, rotor 26 starts and at 270° of rotation of rotor 24, rotor 27 starts. At 360° rotor 24 stops and reverses, the others following as they each reach 360° of rotation. It will be understood that the starting and reversal time of each rotor is made to coincide with the harmonic frequency of the respective springs 28. Thus, the spring and the mass of each rotor determines the resonance of oscillation and each rotor driving motor operates in synchronism with the spring 28 of its rotor but only to supply enough power during each operating cycle to overcome any loss in the system and thus to keep the rotors oscillating under the influence of their respective springs.

There is thus provided a novel apparatus for eliminating the effect of spin bearing friction, that is, friction in the rotor bearings, such neutralizing being accomplished by reversing at high frequency the direction of angular shift of the several rotors which, for example, can include one or a plurality. The novel apparatus will prevent gyroscopic drift except of the type due to the center of gravity of the gyro assembly failing to coincide with the point of intersection 15 of the three orthogonal axes.

What is claimed is:

1. In apparatus of the class described, mounting means for a plurality of rotors, such mounting means having orthogonal axes having a common point of intersection, and power means for angularly oscillating said rotors about their respective axes at a constant frequency, each cycle of oscillation including angular motion in opposite directions.

2. In apparatus of the class described, mounting means for a plurality of angularly shiftable elements, such mounting means comprising shaft means having orthogonal axes having a common point of intersection, there being two pairs of such elements mounted upon each of such axes, one pair on each side of such point of intersection, and means for controlling said elements mounted coaxially upon each axis as follows: means for angularly shifting one of the elements of a pair thereof through a selected angular increment comprising a half cycle, such element reaching its maximum angular velocity at the quarter cycle point, means for angularly shifting such element in a reverse direction through another half cycle to complete one cycle thereof, means for similarly angularly shifting the other rotor of such pair but out of phase with such first rotor of the pair by one quarter phase, and means for angularly shifting the other two rotors upon such axis in similar phase relationship and similar angular amounts.

3. In apparatus of the class described, mounting means for a plurality of rotors, such mounting means comprising means having three mutually perpendicular axes wherein any one of such axes is perpendicular to the other two and intersects same at a common point, there being rotors mounted coaxially on opposite sides of such point upon each of such axes, such apparatus being constructed and arranged whereby the center of gravity thereof coincides with such point of intersection, and power means for angularly oscillating such rotors about their respective axes at a constant frequency, each cycle of oscillation including angular motion first in one direction and then in an opposite direction.

4. Apparatus in accordance with claim 3 including means for controlling said power means for oscillating said rotors in preselected phase relation.

5. In apparatus of the class described, mounting means for a plurality of rotors, such mounting means comprising means having three mutually perpendicular axes wherein any of such axes is perpendicular to the other two and intersects same at a common point, there being mounted coaxially upon each of such axes two pairs of rotors, one pair on each side of such point of intersection, such apparatus being constructed and arranged wherein the center of gravity thereof coincides with such point of intersection, power means for angularly shifting each of such rotors on each axis in one direction from a position at rest through a selected angle to a second position at rest and back to such first rest position in the opposite direction, and means for controlling said power means for angularly shifting said rotors in a preselected phase relation.

6. Apparatus of the class described including, rotor mounting means having three mutually perpendicular axes wherein any one of such axes is perpendicular to the other two, such axes intersecting at a common point, the mounting means of each of such axes mounting two pairs of rotors, one pair on each side of such point of intersection, and means for oscillating at a selected constant frequency one quarter cycle out of phase with one another the two rotors of each such pair, such oscillation comprising angular motion through a selected angular increment and return, the maximum velocity occurring at the quarter cycle point.

7. Apparatus of the class described, mounting means having three mutually perpendicular axes wherein any one of such axes is perpendicular to the other two, such axes intersecting at a common point, the mounting means of each of such axes mounting at least one angularly shiftable element on each side of such point of intersection, and means for oscillating at a constant frequency and out of phase with one another by a selected amount said angularly shiftable elements on each such axis.

8. In apparatus of the class described, mounting means for a plurality of angularly shiftable elements, such mounting means comprising shaft means having three orthogonal axes which intersect at a common point comprising the center of gravity of such apparatus, the shaft means of each of such three axes coaxially mounting at least two such angularly shiftable elements, one on each side of such point of intersection, and means for oscillating such coaxial elements in one direction and then in a reverse direction through an angular increment and out of phase by a selected amount.

9. In apparatus of the class described, a pair of rotors, and power means for oscillating each rotor about a selected axis in opposite angular directions at a constant frequency, and means for controlling said power means to oscillate said rotors out of phase with one another by a selected amount.

10. In apparatus of the class described, a first group of rotors including two pairs thereof, means for mounting said two pairs of rotors for angular movement about a first axis, such two pairs of rotors being disposed on opposite sides of a selected point on such axis, a second group of rotors also comprising two pairs thereof, means for mounting said second group of rotors for angular movement about a second axis, such axis being perpendicular to the first and intersecting the aforementioned point, a third group of rotors comprising two pairs thereof, means for mounting said third group of rotors for angular movement around a third axis which intersects said selected point and is perpendicular to the plane formed by the first two mentioned axes, each group of such rotors being positioned with such selected point between the two pairs comprising the group, such apparatus being constructed and arranged to place the center of gravity thereof at such point, means for oscillating the rotors of each group through a succession of continuous cycles at a common frequency, each cycle comprising angular movement first in one and then in an opposite direction about the group axis, and phasing means for maintaining a selected phase separation of the oscillation of the rotors of each such pair.

References Cited in the file of this patent

UNITED STATES PATENTS

| | | |
|---|---|---|
| 1,997,893 | Wilkinson | Apr. 16, 1935 |
| 2,109,283 | Boykow | Feb. 22, 1938 |
| 2,835,131 | Vacquier et al. | May 20, 1958 |

FOREIGN PATENTS

| | | |
|---|---|---|
| 762,301 | Great Britain | Nov. 28, 1956 |